Patented Oct. 11, 1932

1,882,518

UNITED STATES PATENT OFFICE

OTTO NICODEMUS, OF HOCHST-ON-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

THE PROCESS OF PREPARING ORGANIC BASES

No Drawing. Application filed January 4, 1928, Serial No. 244,560, and in Germany January 5, 1927.

This invention relates to organic bases and process of preparing them.

As is known, acetylene is capable of forming condensation products with ammonia or hydrogen sulfide at an elevated temperature and with the action of contact substances. Thus, nitrogen- or sulfur-containing organic products are obtained in developing acetylene from carbide at an elevated temperature and in the presence of ammonia or hydrogen sulfide by the influence of heated calcium hydroxide (see "Handbuch für Acetylene" 1904, page 193). This observation was afterwards applied also to other contact substances of an oxidic type containing hydroxyl groups or hydrate water. A number of further contact substances have also been described which cause the production of acetonitrile together with aldehyde-ammonia, pyrrol and pyridine-homologues from acetylene and ammonia. Said processes did not, however, gain any practical importance as the reaction products are of a non-uniform kind and there is obtained too large a quantity of trifling substances, particularly the poisonous and technically useless acetonitrile which is always obtained as the chief product.

Now I have found that the transformation of the above mentioned substances can be caused to take quite another cource and that uniform organic bases are obtained from acetylene and ammonia, while considerably diminishing or entirely avoiding the formation of acetonitrile by using for the catalysis instead of the hitherto known oxidic and hydrate-water containing contact substances, such inorganic salts as are capable of forming additive compounds with ammonia. There may be used for this purpose for instance the halogenides in an anhydrous form. The additive compounds of the halogenides of all groups of the periodic system with ammonia have this catalytic action, of course with variations, and the best results can be obtained with such substances the additive compound of which are stable at the required temperatures of the reaction and are capable of yielding with pyridine stable double-compounds.

Active contact substances are for instance obtained by soaking suitable carriers, such as pumice stone, asbestos or pieces of coke, all dried at 500° C. to 600° C., together with the solutions of the anhydrous halogenides in absolute alcohol or methanol, evaporating the solvent and treating the remaining mass with ammonia at the ordinary or at an elevated temperature; this preliminary treatment with ammonia may, however, also be dispensed with.

By passing over such contact substances at a temperature exceeding 200° C. a mixture of acetylene with a compound of the following formula:

wherein $x$ and $y$ stand for hydrogen, alkyl, aralkyl or aryl, technically valuable organic bases are obtained which are more or less rich in bound hydrogen according to the selection or combination of the additive compounds of ammonia with metal salts belonging to the different groups of the periodic system, so that, as desired, primary, secondary or tertiary organic bases may be prepared.

Thus by starting for instance from acetylene and ammonia and using zinc chloride-ammonia as a catalyst at 280° C. to 300° C., a mixture of hydrogenated bases is obtained which are entirely different from the bodies obtainable with the aid of the oxidic contact substances above referred to. These new bodies constitute hydrogenated amines the fractions of which up to and above 150° C. are readily soluble in water, that is to say primary condensation products from acetylene and ammonia. This observation is entirely surprising and has hitherto not been described.

The fractions boiling below 100° C. consist chiefly of diethylamine, besides ethylamine and triethylamine, and the following fraction chiefly of hydrogenated cyclic bases. The principal fraction, boiling from 120° C. to 145° C., consists of α- and γ- methylpyridine. The higher-boiling bases are poly-methylated pyridines and polynuclear heterocyclic rings, as for instance such of the type of the quinoline and phenanthridine.

The reaction itself is very exothermic; it is, therefore, advantageous to take care that the temperature of the reaction does not exceed the desired degree, and that the gas is diluted, for instance by conducting the process in a cycle. This is accomplished by pumping the gases of the reaction by means of a gas pump in rapid circulation through the reaction vessel, the quantity of fresh gas admitted being very small in proportion to the quantity being pumped and the quantity of waste gas being still smaller. By the circulation speed of the gas in the contact vessel and the dilution of the gases of reaction brought about in this manner, the reaction temperature is kept at the desired point. This precaution warrants a long life of the contact substances and the yield of bases is relatively high as compared with the acetylene used.

The temperatures of the reaction vary according to the kind of contact substances between 280° C. and 450° C. The optimum of the temperature for the zinc chloride catalyst is 290° C to 305° C.

The basic condensation products can be used both as intermediate products and particularly as solvents, because the pyridine bases and the bases which are richer in hydrogen and easily soluble in water, are extremely suitable for this purpose.

The same contact substances are also eminently suitable for condensing actylene with aromatic bases so as to form heterocyclic compounds. Various attempts have already been made to condense acetylene with aromatic primary bases, especially with aniline. The result of these experiments has been in all cases unsatisfactory since the quantity of the reaction products obtained was very small and both the degree of the transformation and the course of the reaction could not be influenced at all (see "Berichte der Deutschen Chemischen Gesellschaft" volume 55, page 3854). Indol was always found to be the chief product of the condensation, sometimes admixed with traces of naphthylamine, carbazole and quinoline.

Contrary to these observations, we have found that the condensation of acetylene and aromatic bases can, indeed, be influenced by contact substances not only as regards the quantity but also as regards the kind of the reaction product, as the condensation does not result in the formation of the indol ring but of the quinaldine nucleus, a fact which could not be foreseen. As catalysts for this peculiar reaction all inorganic salts forming additive compounds with ammonia may be used, as above indicated, for instance the halogenides, which when applied on a suitable carrier may be used either per se or in the form of their addition products with the bases employed in each case for the reaction. Over these contact substances are conducted at temperatures exceeding 200° C. mixtures of acetylene with vapors of aromatic bases or of derivatives or substitution products thereof; both primary and secondary bases can be used for the condensation. The chief product of the condensation, easily obtained, according to the kind of base used, with a yield up to 65 per cent. of the base reacted upon, is quinaldine or its homologues and substitution products; besides, there are obtained hydrogenated quinaldines and high-boiling and resinous polymerisation products; N-alkylated indol derivatives are found only when secondary amines are used, and even then only in a very small quantity compared with that of the quinaldine bases.

By using instead of the aromatic amines aliphatic primary or secondary bases, such as methylamine, ethylamine or diethylamine for the condensation with acetylene, methylated pyridines are obtained corresponding to those obtainable with the aid of the same catalysts from ammonia and acetylene. However, by carrying out, the condensation of acetylene with benzylamine another mixture of bases is obtained which contains besides phenylated pyridines also isoquinoline or methylated isoquinoline.

The following examples illustrate my invention, but they are not intended to limit it thereto:

1. 2 liters of pumice stone burnt at 500° C. are soaked with a solution of 275 g. of anhydrous zinc chloride in absolute alcohol, freed from the solvent in a current of nitrogen at 200° C. and filled into a contact vessel. The vessel is then heated to 200° C., dry ammonia is passed through the contact substance and when the internal temperature has attained 200° C., dry acetylene is added thereto. The internal temperature of the contact substance soon begins to rise so that it is necessary to work in the gas cycle so as to remove the reaction heat evolved. This is accomplished by pumping the gases of the reaction by means of a gas pump in rapid circulation through the reaction vessel, the quantity of fresh gas admitted being very small in proportion to the quantity being pumped, the quantity of waste gas being still smaller. If 400 litres of ammonia are caused to pass the cycle of the process during one hour, and if a fresh quantity of gas consisting of 10 litres of ammonia and 10 to 20 litres of acetylene is added therto, while the quantity of the gas leaving the vessel amounts to 10 litres, the internal temperature remains at 280° C. to 290° C., the external temperature being 220° C. to 230° C. The gas which leaves the contact vessel contains chiefly ammonia which is recovered, furthermore 1 to 2 per cent. of methane, 20 to 30 per cent. of hydrogen, 10 to 20 per cent. of heavy hydrocarbons. Thus 95 per cent. of the acetylene used can be transformed. The reaction products after having left the contact substance are liquefied by cooling them to a very low temperature and filtered by suction in a continuous way. On an average, 90 to 95 g. of a liquid condensate are obtained from 100 liters of acetylene. The contact substance may be worked for weeks without its activity being weakened thereby. The distilled condensate shows on an average the following fractions:

Boiling point 50° C. to 85° C.=15-20%; chiefly diethylamine.
Boiling point 85° C. to 120° C.=5-6%; triethylamine and cyclic bases rich in hydrogen.
Boiling point 120° C. to 200° C.=60-65%; chiefly α- and γ- methylpyridine of the following constitution:

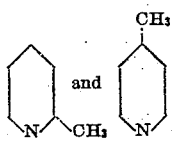

Boiling point 200° C. to 300° C.=10-12%; higher methylated pyridines and polynuclear heterocyclic rings.

Acetonitrile is obtained only in traces provided that the temperature of the reaction does not exceed 305° C. all fractions are soluble in acids; up to a boiling point of 160° C., they are readily soluble in water. They constitute chiefly secondary and tertiary bases of excellent dissolving properties.

2. A mixture of acetylene and ammonia is passed at an external temperature of 220° C. to 230° C. and an internal temperature of 290° C. to 300° over a contact substance prepared in the manner indicated in Example 1 from equimolecular quantities of anhydrous iron chloride and zinc chloride, while the temperature of the reaction is maintained at the said degree by working in a cycle as described in Example 1. The condensation products are liquefied; on an average 93 g. of condensate are obtained from 100 liters of acetylene. The following average fractions are obtained by distillation:

Boiling point 70° C. to 110° C.=8 per cent. and
Boiling point 110° C. to 200° C.=70 per cent., the remainder which boils over 180° C. amounts to 20 per cent. of the reaction product. The main fraction obtained at the boiling point of 110° C. to 200° C. consists of the technically valuable isomeric methylated pyridines which may either be used as intermediate products when separated in a suitable manner or integrally as a solvent.

By effecting the condensation of acetylene with ethylamine, methylamine or diethylamine instead of ammonia, there is likewise obtained a mixture of isomeric methylated pyridines.

3. A mixture of acetylene and ammonia is passed under the conditions set forth in the preceding examples over a contact substance prepared in the manner indicated in Example 1 and consisting of a mixture of 183 g. of anhydrous cadmium chloride and 135 g. of anhydrous copper chloride. The reaction products amount to 70 per cent. of the theory calculated upon acetylene. On an average there will run over at 70° C. to 110° C. 9 per cent., at 100° C. to 180° C. 72 per cent. and above 180° C. 18 per cent. of the condensate. Also in this case the main fraction consists of the pyridine homologues which are particularly valuable in practice; the reaction product contains only 2 per cent. of acetonitrile.

4. Vapors of aniline mixed with acetylene are conducted at 300° C. to 320° C. over a contact substance prepared by loading burnt pumice stones with molten anhydrous zinc chloride. It is advantageous to work with an excess of acetylene and in the gas cycle so as better to discharge the resulting heat. After having left the contact substance, the reaction product is condensed and fractionated, any unaltered aniline which may be present being reconducted into the process. The condensation of acetylene and aniline occurs with formation of hydrogen, so that the gas leaving the cycle contains hydrogen to a greater or less extent. By distilling the reaction product there is obtained with a yield of 52 per cent. of the aniline reacted upon, a base distilling at 244° C. to 248° C. which proves to be quinaldine of the formula:

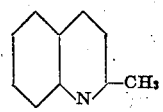

by its picrate melting at 192° C. to 193° C. and by its iodine-melthylate melting at 195° C. The contact substance used remains active for a long time, but it gradually becomes inactive by resinification.

When using for the condensation ortho-toluidine instead of aniline, there is obtained, with a yield of 62 per cent. of the toluidine used the already known 2.8-dimethyl-quinoline boiling at 252° C.

5. A mixture of acetylene and vapors of aniline is passed at 350° C. over a contact substance consisting of burnt pumice stones loaded with anhydrous iron chloride, advantageously while working in the acetylene cycle in the manner indicated in Example 1. By fractionating the reaction products quinaldine is obtained with a yield of 48 per cent. of the aniline used in the reaction. The contact substance used remains active for a long time and is not resinified to such an extent as the contact substance containing zinc chloride.

6. Cobalt chloride is dissolved in meta-xylidine and the double compound thus obtained is used for soaking burnt pumice stones. Acetylene mixed with meta-xylidine vapors is passed over this contact substance under the reaction conditions stated in Example 1. The reaction product worked up by fractionation contains chiefly the known 2.6.8-trimethyl-quinoline of the formula:

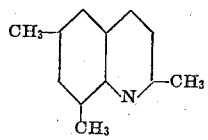

the picrate of which has the melting point of 185° C. The contact substance containing cobalt which is at the beginning of high activity soon becomes inactive by being chocked with soot.

7. A mixture of acetylene with vapors of monoethylaniline is passed over the same contact substance containing zinc chloride and under the same reaction conditions as indicated in Example 4. Contrary to the primary bases, the transformation to the secondary base is smaller, but one liter of contact substance is still capable of condensing 15 to 20 liters of acetylene per hour. The reaction product consists of quinaldine in a quantity amounting to 35 to 40 per cent of the ethylaniline transformed; besides, a quantity of N-ethylindol of the formula:

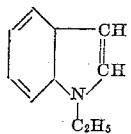

amounting to 10 and 15 per cent. is obtained, the picrate of which melts at 102° C. to 103° C. Furthermore the quinaldine is mixed with a larger or smaller quantity of a base the picrate of which melts at 152° C. and is more readily soluble than the quinaldine picrate. The result of the analysis is as follows: 53.49% of carbon, 4.12% of hydrogen and 14.2% of nitrogen. The product is, therefore, most probably an N-ethyldihydroquinaldine of the formula:

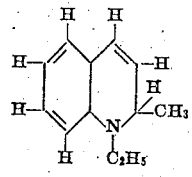

for the picrate of which shows the following figures: 53.73% C, 4.5% H, 13.93% N.

8. A mixture of acetylene and ortho-chloraniline is conducted over the same contact substance and under the same conditions as those set forth in Example 1. From the reaction product which has been worked up by fractional distillation, 2-methyl-8-chloroquinoline of the formula:

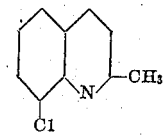

is obtained with a yield amounting to 40 per cent. of the transformed chloraniline.

I claim:

1. The process which comprises passing vapors comprising acetylene and ammonia at a temperature between 280° C. and 450° C., over such inorganic salts, as are known by their property of forming additive compounds with ammonia.

2. The process which comprises passing vapors comprising acetylene and ammonia at a temperature between 280° C. and 450° C., over such anhydrous inorganic halogenides as are known by their property of forming additive compounds with ammonia stable at a temperature exceeding 200° C.

3. The process which comprises passing vapors comprising acetylene and ammonia at a temperature between 280° C. and 450° C., over anhydrous zinc chloride.

4. The process which comprises passing vapors comprising acetylene and ammonia at a temperature between 280° C. and 310° C., over such inorganic salts, as are known by their property of forming additive compounds with ammonia.

5. The process which comprises passing vapors comprising acetylene and ammonia at a temperature between 280° C. and 310° C., over such anhydrous inorganic halogenides as are known by their property of forming additive compounds with ammonia stable at a temperature exceeding 200° C.

6. The process which comprises passing vapors comprising acetylene and ammonia at a temperature between 280° C. and 310° C., over anhydrous zinc chloride.

7. The process which comprises passing vapors comprising acetylene and ammonia over a catalyst obtainable by loading a carrier, having a large surface, with zinc chloride, while strictly maintaining the temperature of the catalyst between 280° C. and 310° C. and removing the excess of the reaction heat.

8. The process which comprises passing vapors consisting of acetylene and a compound of the following formula:

wherein $x$ stands for hydrogen, alkyl, or a group of the benzene series and $y$ stands for hydrogen, alkyl, or a group of the benzene series, at a temperature exceeding 200° C. over such inorganic salts, as are known by their property of forming additive compounds with ammonia while preventing a rise of temperature above 450° C. by removing the heat of reaction.

9. The process which comprises passing vapors consisting of acetylene and a compound of the following formula:

wherein $x$ stands for hydrogen or alkyl and $y$ stands for hydrogen or a group of the benzene series, at a temperature exceeding 200° C. over such inorganic salts, as are known by their property of forming additive compounds with ammonia while preventing a rise of temperature above 450° C. by removing the heat of reaction.

10. The process which comprises passing vapors consisting of acetylene and ammonia at a temperature exceeding 200° C. over such inorganic salts, as are known by their property of forming additive compounds with ammonia while preventing a rise of temperature above 450° C. by removing the heat of reaction.

11. The process which comprises passing vapors consisting of acetylene and a compound of the following formula:

wherein $x$ stands for hydrogen, alkyl, or a group of the benzene series and $y$ stands for hydrogen, alkyl, or a group of the benzene series, at a temperature exceeding 200° C. over such anhydrous inorganic halogenides as are known by their property of forming additive compounds with ammonia stable at a temperature exceeding 200° C. while preventing a rise of temperature above 450° C. by removing the heat of reaction.

12. The process which comprises passing vapors consisting of acetylene and a compound of the following formula:

wherein $x$ stands for hydrogen or alkyl and $y$ stands for hydrogen or a group of the benzene series, at a temperature exceeding 200° C. over such anhydrous inorganic halogenides as are known by their property of forming additive compounds with ammonia stable at a temperature exceeding 200° C. while preventing a rise of temperature above 450° C. by removing the heat of reaction.

13. The process which comprises passing vapors consisting of acetylene and ammonia at a temperature exceeding 200° C. over such anhydrous inorganic halogenides as are known by their property of forming additive compounds with ammonia stable at a temperature exceeding 200° C. while preventing a rise of temperature above 450° C. by removing the heat of reaction.

14. The process which comprises passing vapors consisting of acetylene and a compound of the following formula:

wherein $x$ stands for hydrogen, alkyl, or a group of the benzene series and $y$ stands for hydrogen, alkyl, or a group of the benzine series, at a temperature exceeding 200° C. over anhydrous zinc chloride while preventing a rise of temperature above 450° C. by removing the heat of reaction.

15. The process which comprises passing vapors consisting of acetylene and a compound of the following formula:

wherein $x$ stands for hydrogen or alkyl and $y$ stands for hydrogen or a group of the benzene series at a temperature exceeding 200° C. over anhydrous zinc chloride while preventing a rise of temperature above 450° C. by removing the heat of reaction.

16. The process which comprises passing vapors consisting of acetylene and ammonia at a temperature exceeding 200° C. over anhydrous zinc chloride while preventing a rise of temperature above 450° C. by removing the heat of reaction.

17. The process which comprises passing vapors consisting of acetylene and ammonia at a temperature between 280° C. and 450° C., over such inorganic salts, as are known by their property of forming additive compounds with ammonia while preventing a rise of temperature by removing the heat of reaction.

18. The process which comprises passing vapors consisting of acetylene and ammonia at a temperature between 280° C. and 450° C., over such anhydrous inorganic halogenides as are known by their property of forming additive compounds with ammonia stable at a temperature exceeding 200° C. while preventing a rise of temperature by removing the heat of reaction.

19. The process which comprises passing vapors consisting of acetylene and ammonia at a temperature between 280° C. and 450° C. over anhydrous zinc chloride while preventing a rise of temperature by removing the heat of reaction.

20. The process which comprises passing vapors consisting of acetylene and ammonia at a temperature between 280° C. and 310° C., over such inorganic salts, as are known by their property of forming additive compounds with ammonia while preventing a rise of temperature by removing the heat of reaction.

21. The process which comprises pasing vapors consisting of acetylene and ammonia at a temperature between 280° C. and 310° C., over such anhydrous inorganic halogenides as are known by their property of forming additive compounds with ammonia stable at a temperature exceeding 200° C. while preventing a rise of temperature by removing the heat of reaction.

22. The process which comprises passing vapors consisting of acetylene and ammonia at a temperature betwen 280° C. and 310° C., over anhydrous zinc chloride while preventing a rise of temperature by removing the heat of reaction.

23. The process which comprises passing vapors consisting of acetylene and aniline at a temperature between about 280° C. and about 450° C. over such inorganic salts as are known by their property of forming additive compounds with ammonia.

24. The process which comprises passing vapors consisting of acetylene and aniline at a temperature between about 280° C. and about 450° C. over such anhydrous inorganic halogenides as are capable of forming additive compounds with ammonia stable at a temperature exceeding 200° C.

25. The process which comprises passing vapors consisting of acetylene and aniline at a temperature between about 300° C. and about 320° C. over a contact substance prepared by loading burnt pumice-stones with molten anhydrous zinc chloride.

26. The process which comprises passing vapors consisting of acetylene and aniline at a temperature of about 350° C. over a contact substance consisting of burnt pumice-stones loaded with anhydrous iron chloride.

In testimony whereof I have hereunto set my hand.

OTTO NICODEMUS.